United States Patent
Khanna et al.

(10) Patent No.: US 12,417,206 B1
(45) Date of Patent: Sep. 16, 2025

(54) ON-DEMAND FILE TYPE-SPECIFIC GENERATION OF ELECTRONIC COMMUNICATIONS

(71) Applicant: BANK OF AMERICA CORPORATION, Charlotte, NC (US)

(72) Inventors: Saurabh Khanna, Frisco, TX (US); David Balbo, Milltown, NJ (US); Harmeet Kalra, Dublin, CA (US); Jayakrishnan Muraleedharan, Thousand Oaks, CA (US); Richard W. Renner, Granite City, IL (US); Pawan K. Shetty, McKinney, TX (US); Mansoor Zafar, Frisco, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/921,919

(22) Filed: Oct. 21, 2024

(51) Int. Cl.
  *G06F 16/00* (2019.01)
  *G06F 16/11* (2019.01)
  *G06F 16/13* (2019.01)

(52) U.S. Cl.
  CPC ............ *G06F 16/116* (2019.01); *G06F 16/13* (2019.01)

(58) Field of Classification Search
  None
  See application file for complete search history.

(56) References Cited

U.S. PATENT DOCUMENTS

| | | | |
|---|---|---|---|
| 5,182,656 A | 1/1993 | Chevion et al. | |
| 5,631,984 A | 5/1997 | Graf et al. | |
| 6,574,377 B1 | 6/2003 | Cahill et al. | |
| 6,697,512 B2 | 2/2004 | Simonoff | |
| 6,845,366 B1 | 1/2005 | Hassanein et al. | |
| 6,886,136 B1 | 4/2005 | Zlotnick et al. | |
| 6,903,767 B2 | 6/2005 | Robins et al. | |
| 7,010,263 B1* | 3/2006 | Patsiokas | H04L 67/12 455/3.06 |
| 7,421,153 B1* | 9/2008 | Ronca | G06Q 20/227 382/137 |
| 7,436,979 B2 | 10/2008 | Bruce et al. | |
| 7,720,825 B2* | 5/2010 | Pelletier | G06Q 10/10 705/50 |
| 7,729,990 B2 | 6/2010 | Marceau et al. | |

(Continued)

*Primary Examiner* — Hasanul Mobin
(74) *Attorney, Agent, or Firm* — Moore & Van Allen PLLC; Nicholas C. Russell

(57) ABSTRACT

On-demand generation of electronic/digital communication documents. Standardized data files are received which contain the variable and indexing user data needed to generate the digital communication documents for various users. These data files are associated and stored with a corresponding content template file, which includes all of the static data required to generate the digital communication documents. Subsequently, when a request is made for a digital communication document, the data file is accessed and searched for the specific user's variable and indexing data and once retrieved, the digital communication document is generated, in the desired format, using the user's variable and indexing data and the static data found in the associated content template file. In this regard, generation of the document can be in any file format required of the delivery channel, such as online, mobile application, including video and virtual assistance channels, data insight analysis or the like.

20 Claims, 7 Drawing Sheets

(56) References Cited

U.S. PATENT DOCUMENTS

| | | | |
|---|---|---|---|
| 7,802,721 B2 | 9/2010 | Wilson, Jr. et al. | |
| 8,526,751 B2 | 9/2013 | Mitchell et al. | |
| 8,600,879 B2 | 12/2013 | Reyes | |
| 8,610,966 B2 | 12/2013 | Hatzav et al. | |
| 8,718,367 B1 | 5/2014 | Schneider et al. | |
| 8,824,785 B2 | 9/2014 | Ives et al. | |
| 9,082,007 B2 | 7/2015 | Smith et al. | |
| 9,311,048 B1* | 4/2016 | Kapoor | G06F 16/1727 |
| 12,033,050 B1* | 7/2024 | Mancuso | G06N 3/045 |
| 2001/0037297 A1 | 11/2001 | Mcnair | |
| 2002/0087409 A1 | 7/2002 | Joao | |
| 2007/0043650 A1 | 2/2007 | Hughes et al. | |
| 2007/0150412 A1 | 6/2007 | Lamparello et al. | |
| 2009/0112869 A1* | 4/2009 | Duquene | G06F 21/62 707/999.009 |
| 2009/0178098 A1* | 7/2009 | Westbrook | H04N 21/2407 725/115 |
| 2010/0030644 A1 | 2/2010 | Dhamodharan | |
| 2010/0223541 A1* | 9/2010 | Clee | G06F 40/123 715/205 |
| 2011/0099067 A1 | 4/2011 | Cooper et al. | |
| 2011/0182508 A1* | 7/2011 | Ives | G06V 30/412 382/164 |
| 2013/0024360 A1 | 1/2013 | Ballout | |
| 2016/0154239 A9* | 6/2016 | Layson, Jr. | G02B 27/017 345/8 |
| 2017/0200122 A1* | 7/2017 | Edson | H04L 63/104 |
| 2018/0129729 A1* | 5/2018 | Moskwinski | G06F 16/9024 |
| 2020/0137448 A1* | 4/2020 | Major | H04N 21/251 |
| 2022/0382969 A1* | 12/2022 | Heller | G06F 40/131 |
| 2023/0004424 A1* | 1/2023 | Represas | G06Q 10/06 |
| 2024/0005427 A1* | 1/2024 | Betsko | G06Q 50/18 |

\* cited by examiner

ON-DEMAND FILE TYPE-SPECIFIC GENERATION OF ELECTRONIC COMMUNICATIONS

FIELD OF THE INVENTION

The present invention is generally directed to electronic communications and, more specifically, on-demand file-type specific generation of electronic communications.

BACKGROUND

Typically, when an enterprise makes electronic communication documents available to users, the electronic communication documents are generated in advance and stored in one comprehensive document file. Subsequently, when a user requests access to their respective electronic communication document, the document is retrieved from the document and, in most instances converted from the document file format to the user's desired format. For example, financial institutions make financial transaction statements available to their users/customers on a regular schedule (e.g., monthly or the like). Thus, each month a data file comprising details of financial transactions is received from a system of record and a document file (e.g., an Advanced Function Presentation (AFP) file or the like) is generated that includes all of the electronic communication documents (e.g., all of the financial transaction statements). Subsequently, when a user/customer requests their respective financial transaction statement, the document file is accessed and the user's/customer's electronic communication document is retrieved, or the corresponding indexing data including variable data (e.g., financial transaction details) is retrieved and converted to the user's/customer's desired file type (e.g., a file type other than AFP, such portable document format (PDF) or the like).

However, generating and storing all of the electronic communication documents upfront is problematic from a storage capacity standpoint. This storage capacity problem becomes amplified when the enterprise has regulatory requirements that dictate the period of time for retaining the electronic communication documents. Moreover, and equally important from the standpoint of addressing the issue, in almost all instances only a small percentage of the electronic communication documents are accessed from the store (i.e., requested and presented to the users/customers).

Therefore, a need exists to develop systems, computer-implemented methods, computer program products or the like that serve to effectively and efficiently generate electronic communication documents. Specifically, the desired systems, methods and the like should be capable of minimizing digital storage usage while still meeting electronic communication document retention requirements. In addition, the desired systems, methods, and the like should be capable of presenting/outputting the electronic communication documents in any desired file format supporting both conventional formats (e.g., PDF, XML or the like) and emerging formats such as those implemented via video or virtual assistance applications, data analysis applications and the like.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for on-demand file-type specific generation of electronic/digital communication documents. In this regard, the invention provides for generation of electronic/digital communication documents on an as-needed basis (i.e., as requested by the user). As a result, the present invention minimizes the storage usage that would otherwise be required by upfront generation and storage of electronic/digital communication documents for the entirety of the users. Moreover, the on-demand generation of such documents serves to satisfy any retention requirements surrounding specific digital communication documents.

Specifically, the present invention receives standardized data files from systems of record (SOR) which contain the variable and indexing user data needed to generate the digital communication documents for various users. These data files are associated and stored with a corresponding content template file, which includes all of the static data required to generate the digital communication documents (e.g., logos, page layout and the like). Subsequently, when a request is made (by a user or a user's application) for digital communication document, the data file is accessed and searched for the specific user's variable and indexing data and, once retrieved, the digital communication document is generated, in the desired format, using the user's variable and indexing data and the static data found in the associated content template file. In this regard, generation of the document can be in any file format required of the delivery channel, such as online, mobile application, including video and virtual assistance channels, data insight analysis or the like. Moreover, when the desired format is a tagged/accessible format, the invention provides for adding the requisite metadata and structural information to the generated digital communication document prior to presenting/outputting the digital communication document to the delivery channel.

In addition, the present invention provides for retrieving and, in some instances, converting digital communication documents that are stored in historical/legacy digital document files, such as Advanced Function Presentation (AFP) file or the like. In this regard, the present invention provides for retrieving indexing data from each document in the historical/legacy digital document file and storing the indexing/metadata in a separate file that is associated with the document file. Subsequently, when request is made (by a user or a user's application) for a digital communication document from the document file, the indexing data is used to search the document file to retrieve the user's digital communication document and the document is converted from the document file format, such as AFP to the desired file format. In the event that the desired file format is a tagged/accessible format, the invention provides for adding the requisite metadata and structural information to the generated digital communication document prior to presenting/outputting the digital communication document to the delivery channel.

A system for on-demand generation of electronic communication documents defines first embodiments of the invention. The system includes a first computing platform having a first memory and one or more first computing processor devices in communication with the first memory.

The first memory stores an electronic communication document pre-processing engine that is executable by at least one of the one or more first computing processor devices. Electronic communication document pre-processing engine is configured to receive data files from disparate systems of record. The data files are associated with an electronic communication document type and includes variable user data for a plurality of users. For example, the document type may be a transaction statement and the variable user data may be transactions conducted by a financial institution customer over a specified period of time or the users may financial institution customers or the document type may be an invoice and the variable user data may be specific invoice details (e.g., items purchased, price or the like) for a specified customer. Electronic communication document pre-processing engine is further configured to associate a content template file from amongst a plurality of content template files to each data file based on the electronic communication document type. Each content template file includes common resources for a corresponding electronic communication document type. Common resources may include logos, pictures, backgrounds, layout format for the corresponding electronic communication document. In response, electronic communication document pre-processing engine is further configured to store each data file and the corresponding associated content template file in a storage unit within the first memory.

The system additionally includes a second computing platform having a second memory and one or more second computing processor devices in communication with the second memory. The second memory stores an on-demand electronic communication document generation engine that is executable by at least one of the one or more second computing processor devices. On-demand electronic communication document generation engine is configured to receive an electronic communication document request from a user. For example, the electronic communication document request may be received from a user portal, mobile application, website or the like. The electronic communication document request includes (i) a user identifier associated with the user, (ii) an electronic communication document type identifier and (iii) a file type. In response to receiving the electronic communication document request, on-demand electronic communication document generation engine is configured to access the storage unit within the first memory to (i) identify a first data file based on the electronic communication document type identifier, and (ii) search and retrieve, from the first data file, variable user data of the user based on the user identifier. In response to retrieving the variable user data of the user, on-demand electronic communication document generation engine is configured to generate a first electronic communication document using the variable user data of the user and the common resources of the content template file associated with the first data file, and present the first electronic communication document to the user in the file type identified in the request.

In specific embodiments of the system, on-demand electronic communication document generation from stored data files and associated content templates is made possible by receiving the data files from the disparate systems of record in a standardized format that includes user indexing data associated with or comprising the user identifier. As a result, the user variable data can readily be identified and retrieved from the data files.

In other specific embodiments of the system, the on-demand electronic communication document generation engine is further configured to receive, from the user, the electronic communication document request including the file type, which may be one of (i) portable document format (PDF), (ii) extensible markup language (XML) and (iii) comma-separated values (CSV) or the like. In other specific embodiments of the system, the file type may be accessibility-tagged portable document format (PDF), such as a file type compliant with American Disability Act requirements. In such embodiments of the invention, once the on-demand electronic communication document generation engine has generated the document, metadata and structural information is added/tagged to the electronic communication document to ensure accessibility for those with visual impairments or other disabilities.

In other specific embodiments the system is configured to accommodate the generation and presentation of electronic communication documents rendered from legacy Advanced Function Presentation (AFP) files. In such embodiments of the system, electronic communication document pre-processing engine is further configured to receive advanced function presentation (AFP) files, each AFP file including a plurality of electronic communication documents, each of the plurality of electronic communication documents associated with a corresponding user from the plurality of users. Electronic communication document pre-processing engine is further configured extract indexing metadata from each of the plurality of electronic communication documents in each of the AFP files and store each AFP file and corresponding indexing metadata in the storage unit. In related embodiments of the system, the on-demand electronic communication document generation engine is further configured to, in response to receiving the electronic communication document request, access the storage unit of the first memory to (i) identify a first AFP file based on the electronic communication document type identifier, and (ii) search and retrieve, from the first AFP file, a second electronic communication document from amongst the plurality of electronic communication documents based on the corresponding indexing metadata. In response to retrieving the second electronic communication document from the AFP file, on-demand electronic communication document generation engine is further configured to convert the second electronic communication document from AFP file format to the file type in the electronic communication document request and present the second electronic communication document to the user. Moreover, if the user requests accessibility tagged portable document format (PDF) as the file type, on-demand electronic communication document generation engine is further configured to present the second electronic communication document to the user in the file type requested, wherein presenting includes adding/tagging the document with metadata and structural information for purposes of making the document accessible to those with disabilities, such as visual impairments or the like.

A computer-implemented method for on-demand generation of electronic communication documents defines second embodiments of the invention. The computer-implemented method is executed by one or more computing processor devices. The method includes receiving data files from a system of record from amongst a plurality of systems of record. Each of the data files are associated with an electronic communication document type and include variable user data for a plurality of users. The method further includes associating a content template file from amongst a plurality of content template files to each data file based on the electronic communication document type. Each content template file includes common resources for a corresponding electronic communication document. In response, the method includes storing each data file and the associated content template file in a storage unit.

Further, the method includes receiving an electronic communication document request from a user. The electronic communication document request includes (i) a user identifier associated with the user (ii) an electronic communication document type identifier and (iii) a file type. In response to receiving the electronic communication document request, the method further includes accessing the storage unit of the first memory to (i) identify a first data file based on the electronic communication document type identifier, and (ii) search and retrieve, from the first data file, variable user data of the user based on the user identifier. In response to retrieving the variable user data, the method further includes generating a first electronic communication document using the variable user data of the user and the common resources of the content template file associated with the first data file and presenting the first electronic communication document to the user in the file type requested.

In specific embodiments of the computer-implemented method, receiving the data files further comprises receiving the data files, such that each data file is in a standardized format that includes user indexing data associated with or comprising the user identifier.

In other specific embodiments of the computer-implemented method, receiving the electronic communication document request further comprises receiving the electronic communication document, such that the file type is chosen from the group consisting of (i) portable document format (PDF), (ii) extensible markup language (XML) and (iii) comma-separated values (CSV). In other related embodiments of the computer-implemented method, receiving the electronic communication document request further comprises receiving the electronic communication document, such that the file type is accessibility-tagged portable document format (PDF). In such embodiments of the computer-implemented method, presenting further includes adding/tagging metadata and structural information to the electronic communication document to enable access to those with disabilities/impairments.

In other specific embodiments, the computer-implemented method further includes receiving advanced function presentation (AFP) files. Each advanced function presentation file includes a plurality of electronic communication documents, with each of the electronic communication documents associated with a corresponding user from the plurality of users. In response to receiving the AFP files, the method further includes extracting indexing metadata from each of the plurality of electronic communication documents in each of the AFP files and storing each AFP file and corresponding indexing metadata in the storage unit of the first memory. In related embodiments of the computer-implemented method, in response to receiving the electronic communication document request, the method includes accessing the storage unit of the first memory to (i) identify a first AFP file based on the electronic communication document type identifier, and (ii) search and retrieve, from the first AFP file, a second electronic communication document from amongst the plurality of electronic communication documents based on the corresponding indexing metadata. Moreover, the method includes converting the second electronic communication document from AFP file format to the file type in the electronic communication document request and presenting the second electronic communication document to the user in the file type requested.

A computer program product including a non-transitory computer-readable medium defines third embodiment of the invention. The non-transitory computer-readable medium includes sets of codes for causing one or more computing devices to receive data files. Each data file (i) is received from a system of record from amongst a plurality of systems of record, (ii) is associated with an electronic communication document type, and (iii) includes variable user data for a plurality of users. In addition, the computer-readable medium includes a set of codes for causing the computing device(s) to associate a content template file from amongst a plurality of content template files to each data file based on the electronic communication document type. Each content template file includes common resources for a corresponding electronic communication document. In addition, the computer-readable medium includes a set of codes for causing the computing device(s) to store each data file and the associated content template file in a storage unit of the first memory.

In addition, the computer-readable medium includes a set of codes for causing the computing device(s) to receive an electronic communication document request from a user. The electronic communication document request includes (i) a user identifier associated with the user and (ii) an electronic communication document type identifier and (iii) a file type. In response to receiving the electronic communication document request, the computer-readable medium includes sets of codes for causing the computing device(s) to access the storage unit of the first memory to (i) identify a first data file based on the electronic communication document type identifier, and (ii) search and retrieve, from the first data file, variable user data of the user based on the user identifier. Moreover, the computer-readable medium includes sets of code for causing the computing device(s) to generate a first electronic communication document using the variable user data of the user and the common resources of the content template file associated with the first data file and present the first electronic communication document to the user in the file type requested.

In specific embodiments of the computer program product, the set of codes for causing the one or more computing devices to receive the data files are further configured to cause the one or more computing devices to receive the data files, such that each data file is in a standardized format that includes user indexing data associated with or comprising the user identifier.

In further specific embodiments of the computer program product, the set of codes for causing the one or more computing devices to receive the data files are further configured to cause the one or more computing devices to receive the electronic communication document from the user, the electronic communication document request includes the file type chosen from the group consisting of (i) portable document format (PDF), (ii) extensible markup language (XML) and (iii) comma-separated values (CSV).

In other specific embodiments of the computer program product, the set of codes for causing the one or more computing devices to receive the electronic communication document are further configured to cause the one or more computing devices to receive the electronic communication document from the user, the electronic communication document request includes the file type defines as accessibility-tagged portable document format (PDF). In such embodiments of the computer program product, the set of codes for causing the one or more computing devices to present are further configured to cause the one or more computing devices add/tag metadata and structural information to the electronic communication document to provide for access by those with disabilities or the like.

In still further specific embodiments of the computer program product, the sets of codes further comprise sets of codes for causing the one or more computing devices to receive advanced function presentation (AFP) files, wherein each advanced function presentation file includes a plurality of electronic communication documents, each of the plurality of electronic communication documents associated with a corresponding user from the plurality of users, extract indexing metadata from each of the plurality of electronic communication documents in each of the AFP files, and store each AFP file and corresponding indexing metadata in the storage unit of the first memory. In related embodiments of the computer program product, the sets of codes further comprise sets of codes for causing the one or more computing devices to, in response to receiving the electronic communication document request, access the storage unit of the first memory to (i) identify a first AFP file based on the electronic communication document type identifier, and (ii) search and retrieve, from the first AFP file, a second electronic communication document from amongst the plurality of electronic communication documents based on the corresponding indexing metadata, convert the second electronic communication document from AFP file format to the file type in the electronic communication document request, and present the second electronic communication document to the user in the file type requested.

Thus, as described in detail above, present embodiments of the invention include apparatus, methods, computer program products and/or the like that provide for generation of electronic/digital communication documents on-demand (i.e., as requested by the user). As a result, the present invention minimizes the storage usage that would otherwise be required by upfront generation and storage of electronic/digital communication documents for the entirety of the users. Specifically, the present invention receives standardized data files from systems of record (SOR) which contain the variable and indexing user data needed to generate the digital communication documents for various users. These data files are associated and stored with a corresponding content template file, which includes all of the static data required to generate the digital communication documents (e.g., logos, page layout and the like). Subsequently, when a request is made (by a user or a user's application) for digital communication document, the data file is accessed and searched for the specific user's variable and indexing data and, once retrieved, the digital communication document is generated, in the desired format, using the user's variable and indexing data and the static data found in the associated content template file. In this regard, generation of the document can be in any file format required of the delivery channel, such as online, mobile application, including video and virtual assistance channels, data insight analysis or the like.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
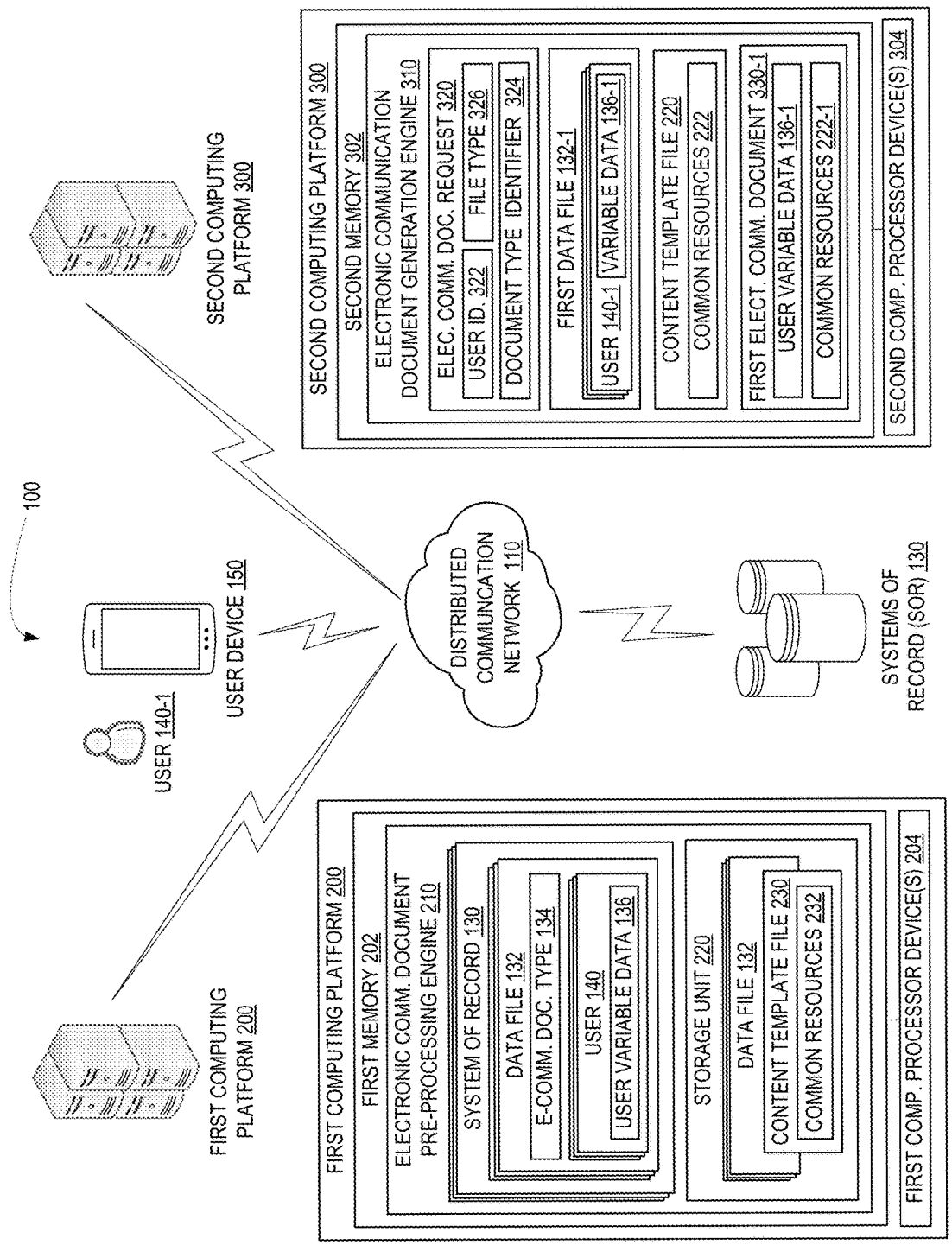
Figure 2:
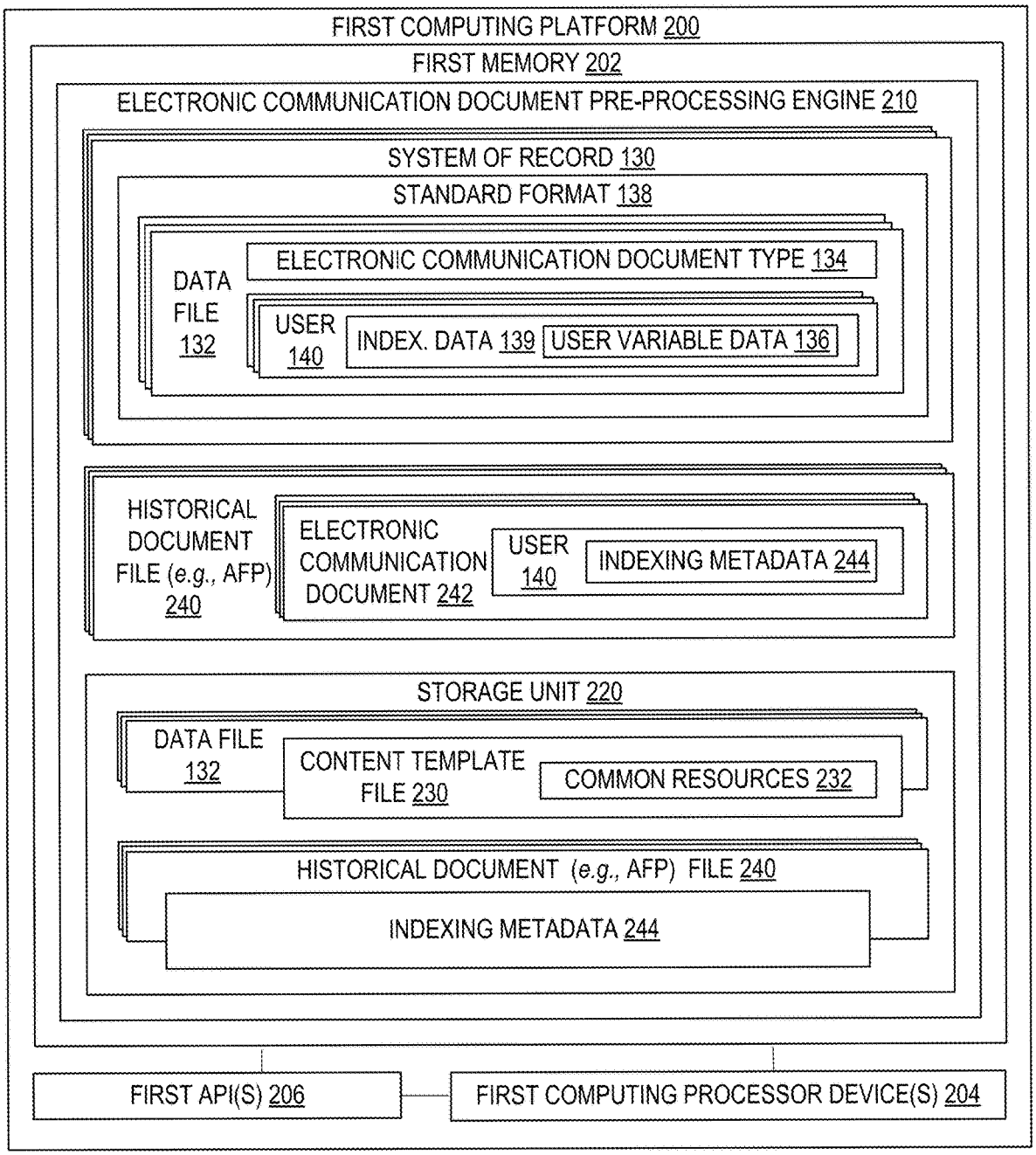
Figure 3:
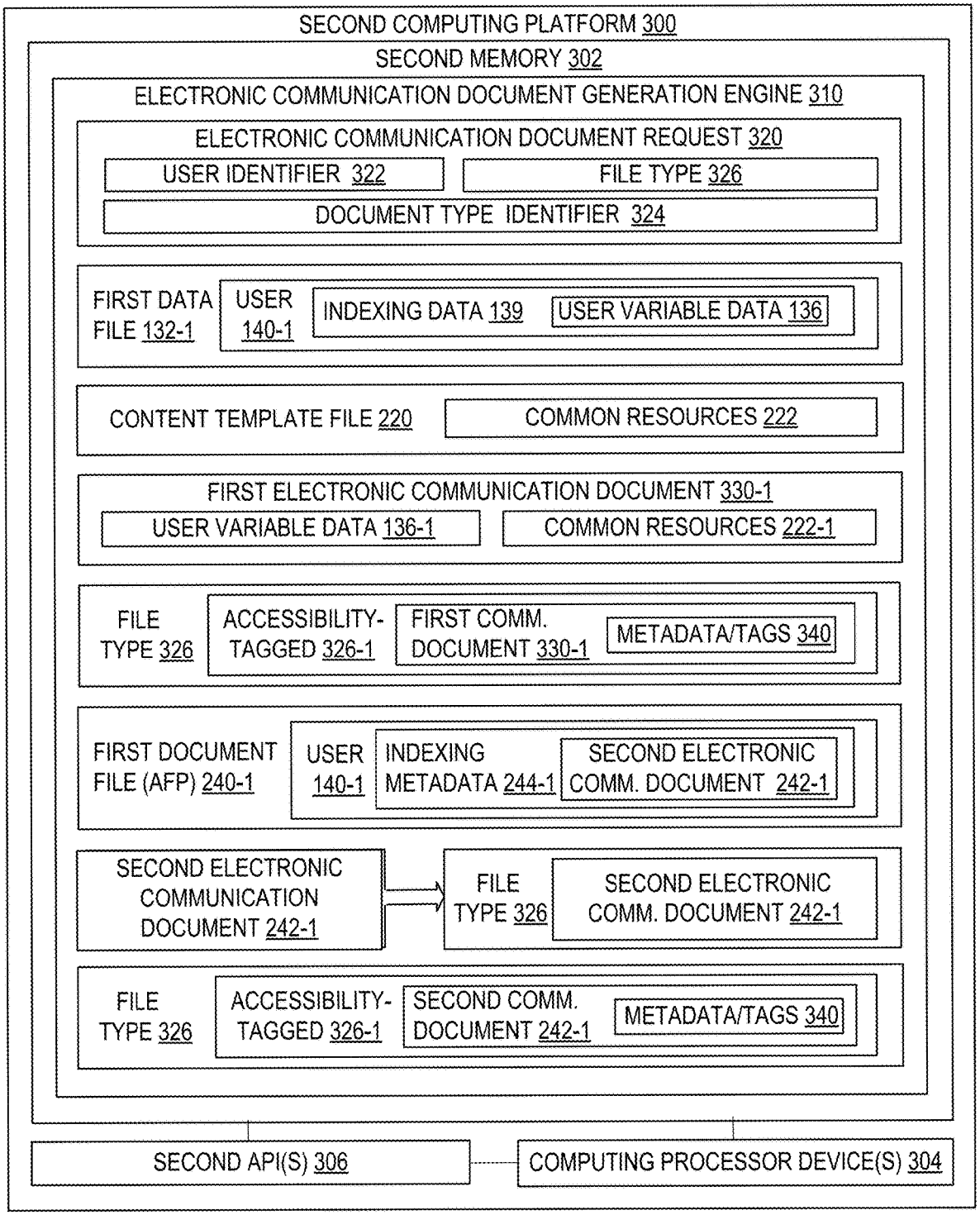
Figure 4:
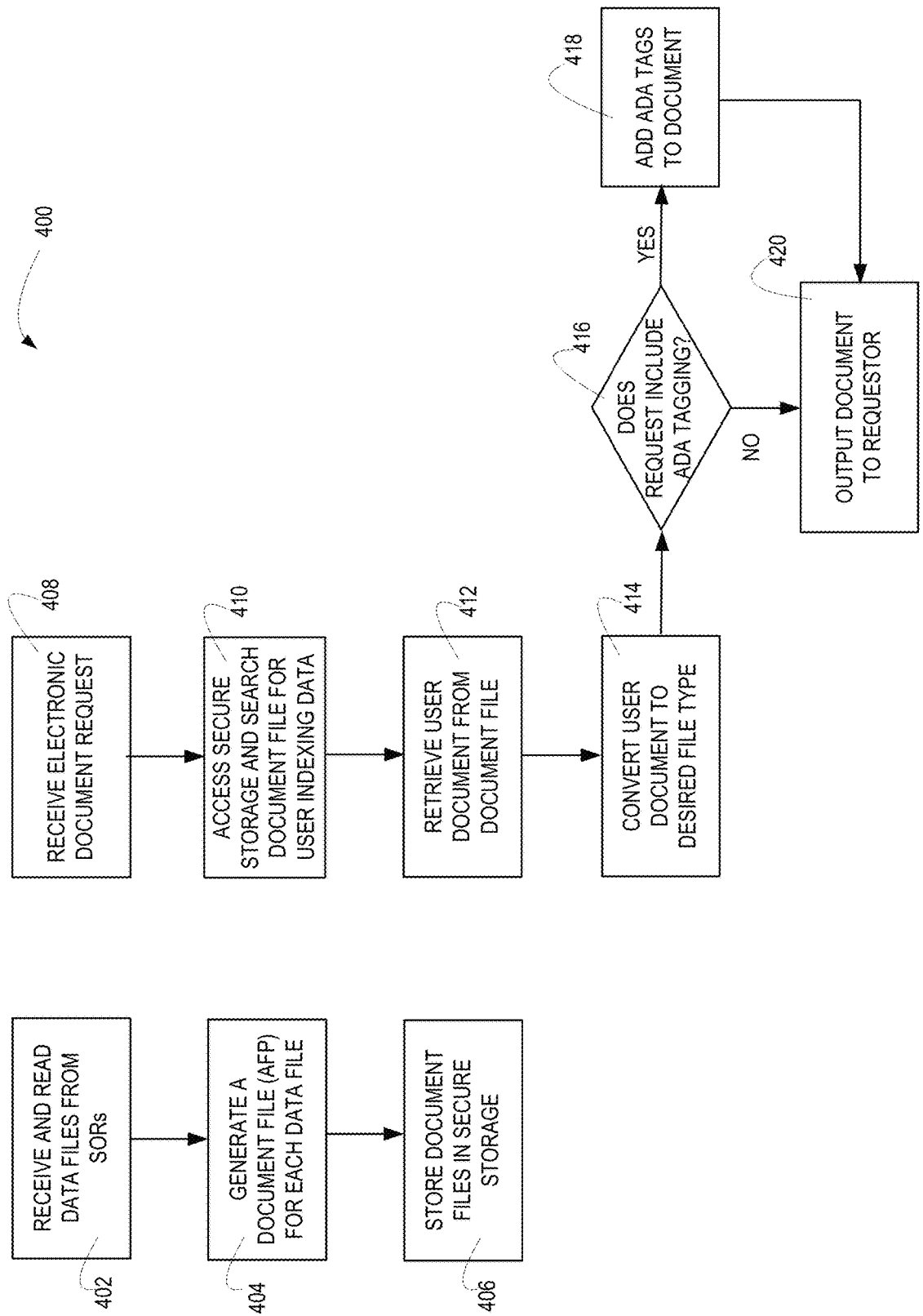
Figure 5:
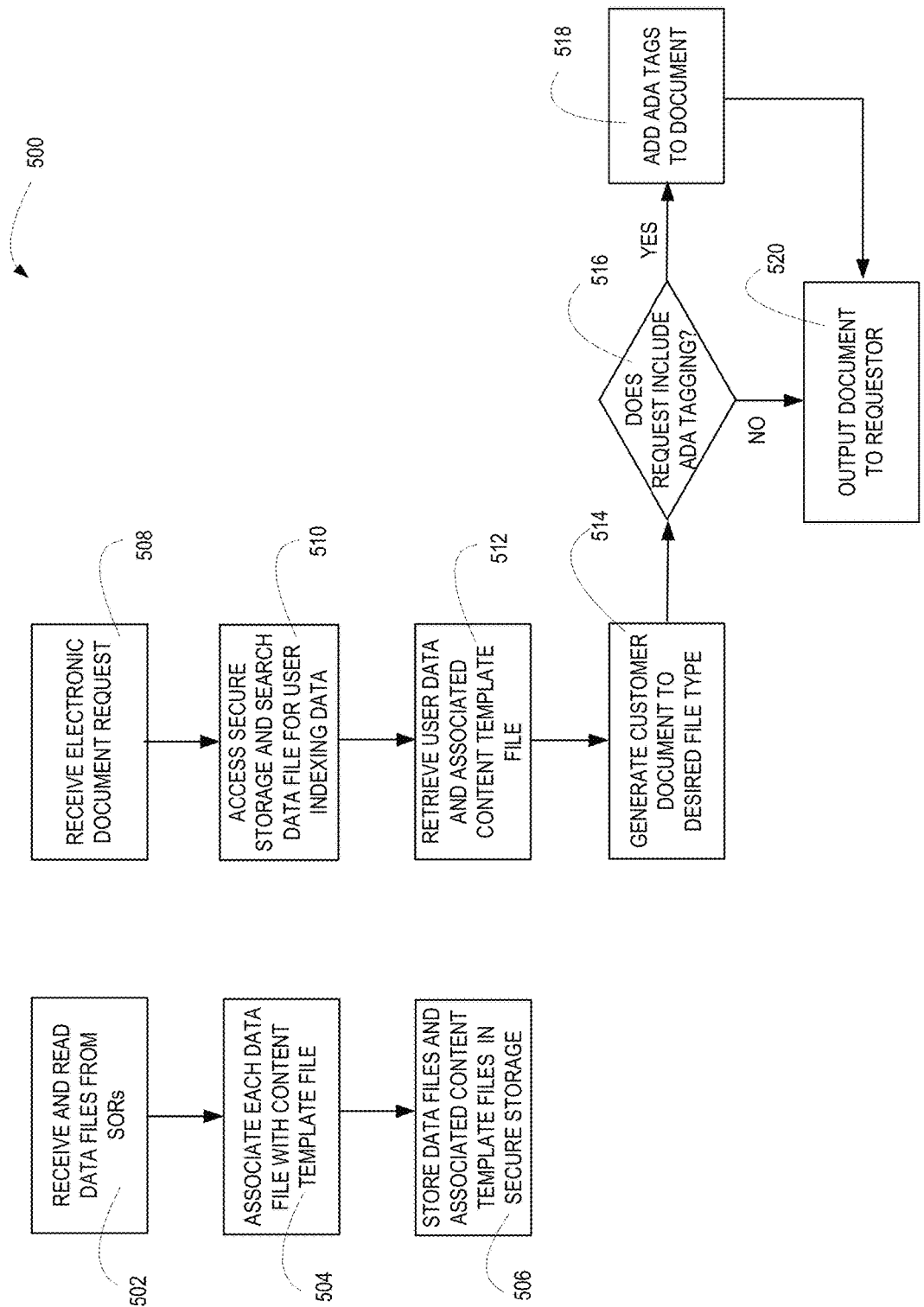
Figure 6:
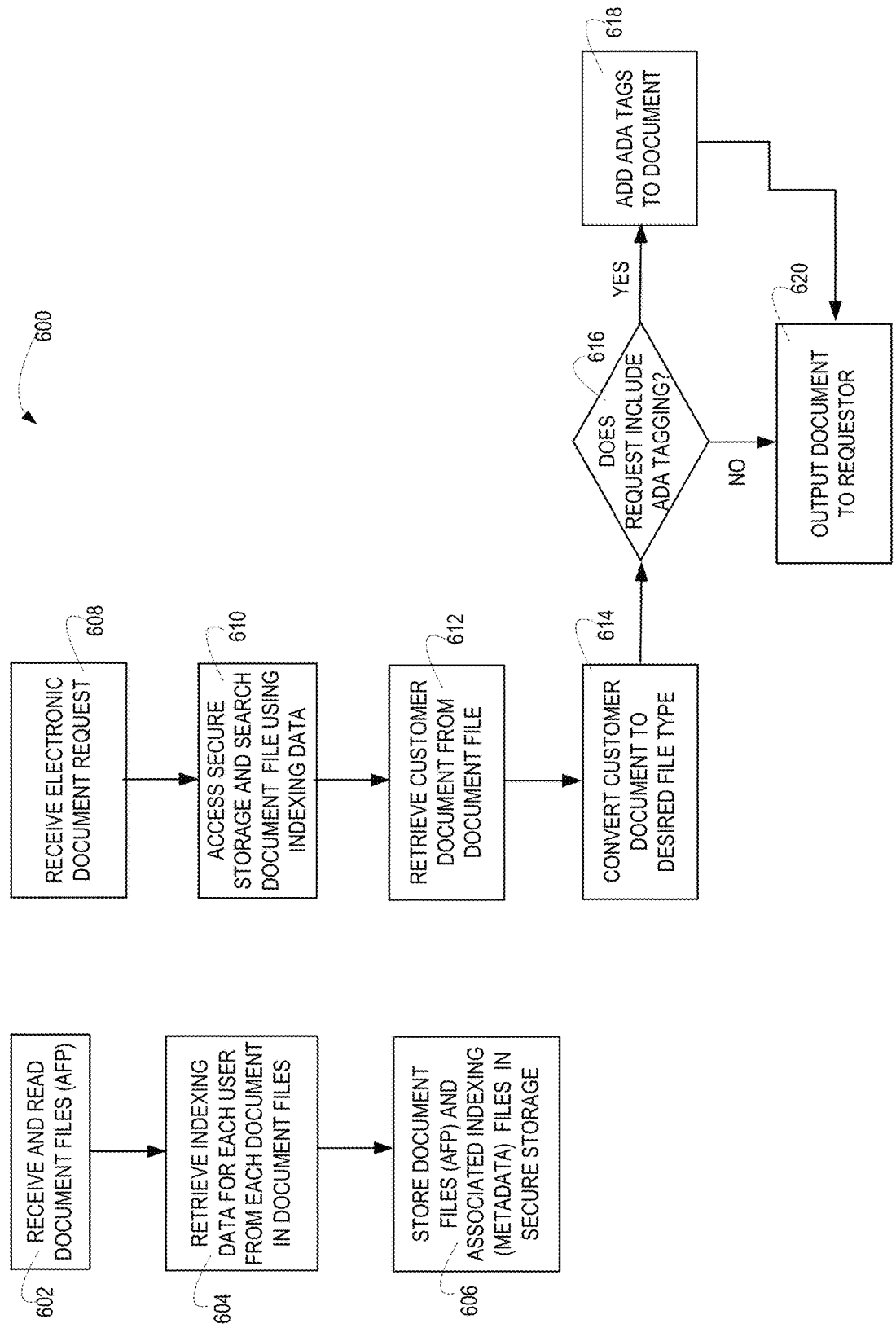
Figure 7:
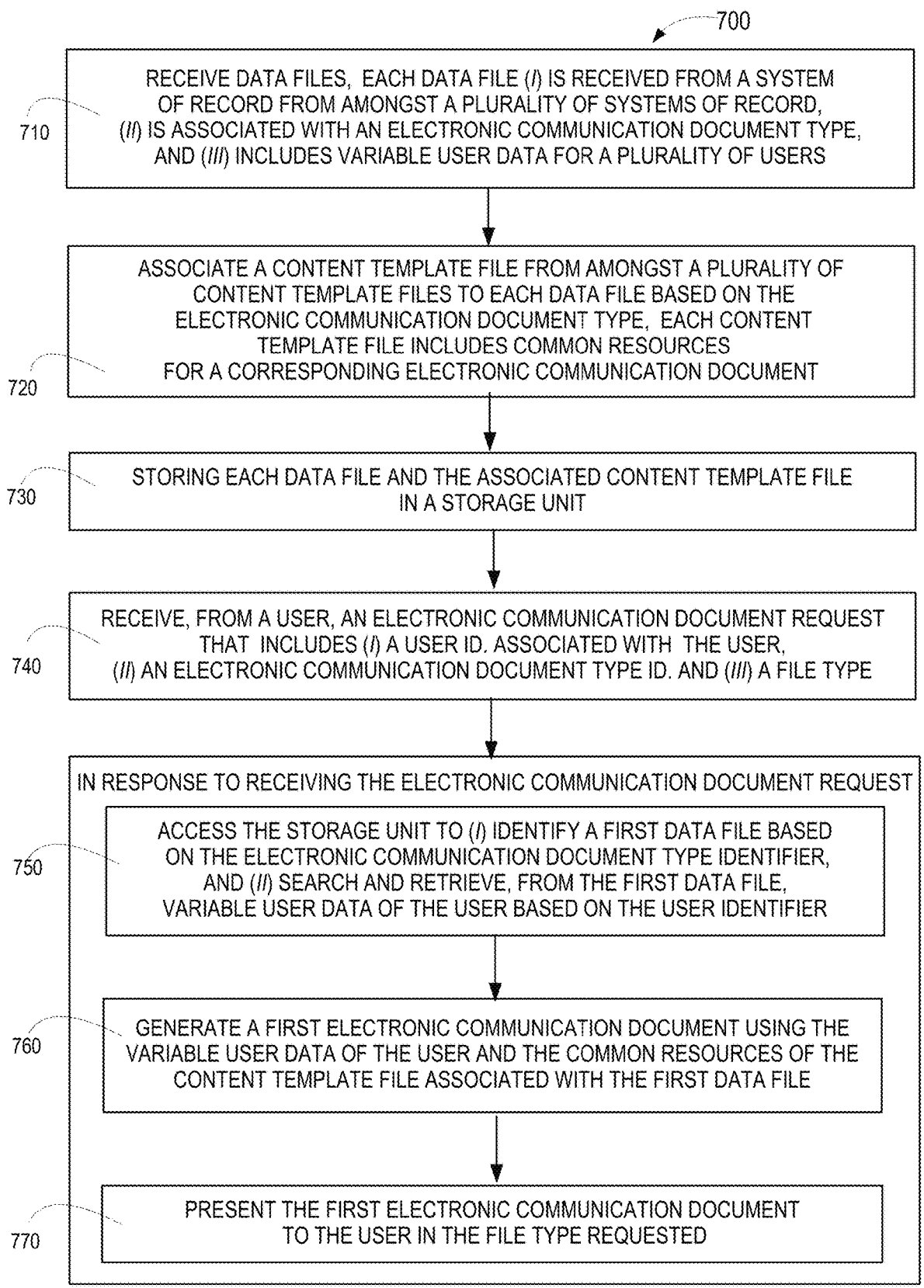

Having thus described embodiments of the disclosure in general terms, reference will now be made to the accompanying drawings, wherein:

FIG. 1 is a schematic/block of a system for on-demand generation of electronic communication documents, in accordance with embodiments of the present invention;

FIG. 2 is a block diagram a first computing platform storing an electronic communication document pre-processing engine, in accordance with embodiments of the present invention;

FIG. 3 is a block diagram of a second computing platform storing an electronic communication document generation engine, in accordance with embodiments of present invention;

FIG. 4 is a flow diagram of a method for electronic communication document generation, storage, retrieval, and conversion, in accordance with the prior art;

FIG. 5 is a flow diagram of a method for on-demand electronic communication document generation, in accordance with embodiments of the present invention;

FIG. 6 is a flow diagram of a method for historical electronic communication document storage, retrieval, and conversion, in accordance with embodiments of the present invention; and FIG. 7 is a flow diagram of a method for on-demand generation of electronic communication documents.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, a.), or an embodiment combining software and hardware aspects that may be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform includes a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for on-demand file-type specific generation of electronic/digital communication documents. In this regard, the invention provides for generation of electronic/digital communication documents on an as-needed basis (i.e., as requested by the user). As a result, the present invention minimizes the storage usage that would otherwise be required by upfront generation and storage of electronic/digital communication documents for the entirety of the users. Moreover, the on-demand generation of such documents serves to satisfy any retention requirements surrounding specific digital communication documents.

Specifically, the present invention receives standardized data files from systems of record (SOR) which contain the variable and indexing user data needed to generate the digital communication documents for various users. These data files are associated and stored with a corresponding content template file, which includes all of the static data required to generate the digital communication documents (e.g., logos, page layout and the like). Subsequently, when a request is made (by a user or a user's application) for digital communication document, the data file is accessed and searched for the specific user's variable and indexing data and, once retrieved, the digital communication document is generated, in the desired format, using the user's variable and indexing data and the static data found in the associated content template file. In this regard, generation of the document can be in any file format required of the delivery channel, such as online, mobile application, including video and virtual assistance channels, data insight analysis or the like. Moreover, when the desired format is a tagged/accessible format, the invention provides for adding the requisite metadata and structural information to the generated digital communication document prior to presenting/outputting the digital communication document to the delivery channel.

In addition, the present invention provides for retrieving and, in some instances, converting digital communication documents that are stored in historical/legacy digital document files, such as Advanced Function Presentation (AFP) file or the like. In this regard, the present invention provides for retrieving indexing data from each document in the historical/legacy digital document file and storing the indexing/metadata in a separate file that is associated with the document file. Subsequently, when request is made (by a user or a user's application) for a digital communication document from the document file, the indexing data is used to search the document file to retrieve the user's digital communication document and the document is converted from the document file format, such as AFP to the desired file format. In the event that the desired file format is a tagged/accessible format, the invention provides for adding the requisite metadata and structural information to the generated digital communication document prior to presenting/outputting the digital communication document to the delivery channel.

Referring to FIG. 1, a schematic/block is presented of a system 100 for on-demand generation of electronic communication documents, in accordance with embodiments of the present invention. Electronic communication documents, as used herein, are documents generated for multiple users, such as, but not limited to, financial institution customers in which the document may be financial transaction statement, or another entity/enterprise's clients in which the document may be transaction invoices or the like.

The system 100 is implemented amongst a distributed communication network 110, which may include the Internet, one or more intranets, cellular network(s) or the like. The system includes first and second computing platforms 200, 300, each including a corresponding first and second memory 202, 302 and corresponding one or more first and second computing processor devices 204, 304 in communication with corresponding first and second memory 202 and 204.

First memory 202 of first computing platform 200 stores electronic communication document preprocessing engine 210, which is executable by at least one of the first computing processor device(s) 204. Electronic communication document preprocessing engine 210 is configured to receive data files 132 from various Systems of Record (SOR) 130. Each data file 132 is associated with and identifies at least one electronic communication document type 134 and includes variable user data for a plurality of users 140. In specific embodiments of the invention, the data files 132 are received from the various SOR 130 in a standardized format which includes user-specific indexing data (not shown in FIG. 1) that is configured to identify each of the users 140.

In response to receiving the data files 132, each data file 132 is associated with a content template file 230 from amongst a plurality of content data files 220 based on the electronic communication document type (e.g., a specific content template file for a financial transaction statement document, a specific template file for invoices and the like). Each content template file 230 includes common resources 232 (e.g., logo, background graphics, document layout parameters and the like) for generating a corresponding electronic communication document. The data files 410 and their associated content template file 220 are stored within a secure storage unit 220 of first memory 202, such as a storage unit 220 that is Write Once Read Many (WORM) compliant to ensure data integrity. It should be noted that the electronic communication document preprocessing engine 210 does not generate a document file, such as an Advanced Function presentation (AFP) file containing the electronic communication documents for all of the users 140 in the data file 132.

Second memory 302 of second computing platform 300 stores electronic communication document generation engine 310, which is executable by at least one of the second computing processor device(s) 304. Electronic communication document generation engine 310 is configured to receive from user device 130, (e.g., directly from the user 140-1 or an application executing on a user device 130) an electronic communication document request 320 that requests presentation of a document to the user. The electronic communication document request 320 includes (i) a user identifier 323 associated with the user 140-1, (ii) and electronic communication document type identifier (e.g., parameters that define the type of document being requested and other criteria, such time period) and a file type 326 for the requested document (e.g., Portable Document Format (PDF), extensible Markup Language (XML) and Comma-Separated Values (CSV), accessibility-tagged PDF or the like).

In response to and in real-time to receiving the electronic communication request 320, electronic communication document generation engine 310, is configured to access the storage unit 220 to identify a first data file based on the electronic communication document type identifier 324 and search and retrieve, from the first data file 132-1, the user's 140-1 variable user data 136-1 based on the user identifier 322. In response to retrieving the variable user data 136-1, electronic communication document generation engine 310 is configured to generate a first electronic communication document 330-1, in the requested file type 326, using the variable user data 136-1 of the user 140-1 and the common resources 222-1 of the content template file 220-1 associated with the first data file, and present the first electronic communication document 330-1 to the user 140-1. Thus, the document 330-1 is generated at the time of the request 320, which results in the use of less storage space/memory since a document file containing documents for all the users, such as an AFP file or the like, is not generated in advance (and stored in memory).

Referring to FIG. 2, a block diagram is depicted of first computing platform 200 highlighting various alternate embodiments of the system shown and described in relation to FIG. 1, in accordance with embodiments of the present invention. First computing platform 200 may comprise one or multiple computing devices, such as servers or the like or the like. As previously discussed in relation to FIG. 1, first computing platform 200 includes first memory 202, which may comprise volatile and/or non-volatile memory, such as read-only memory (ROM) and/or random-access memory (RAM), EPROM, EEPROM, flash cards, or any memory common to computing platforms. Moreover, first memory 202 may comprise cloud storage, such as provided by a cloud storage service and/or a cloud connection service.

Further, first computing platform 200 includes one or more first computing processor devices 204, which may be an application-specific integrated circuit ("ASIC"), or other chipset, logic circuit, or other data processing device. First computing processor device(s) 204 may execute one or more first application programming interface (APIs) 206 that interface with any resident programs, such as electronic communication document pre-processing engine 210 or the like, stored in first memory 202 of first computing platform 200 and any external programs. First computing platform 200 includes various processing sub-systems (not shown in FIG. 2) embodied in hardware, firmware, software, and combinations thereof, that enable the functionality of first computing platform 200 and the operability of first computing platform 200 on a distributed communication network, such as distributed communication network 110 shown in FIG. 1. For example, processing sub-systems allow for initiating and maintaining communications and exchanging data with other networked devices. For the disclosed aspects, processing sub-systems of first computing platform 200 includes any processing sub-system portion used in conjunction with electronic communication document pre-processing engine 210 and engines, tools, routines, sub-routines, applications, sub-applications, sub-modules thereof.

In specific embodiments of the present invention, first computing platform 200 additionally includes a communications module (not shown in FIG. 2) embodied in hardware, firmware, software, and combinations thereof, that enables electronic communications between components of first computing platform 200 and other networks and network devices. Thus, communication module includes the requisite hardware, firmware, software and/or combinations thereof for establishing and maintaining a network communication connection with one or more devices and/or networks.

As previously discussed in relation to FIG. 1, first memory 202 stores electronic communication document pre-processing engine 210 that is executable by one or more of the first computing processor device(s) 204. Electronic communication document pre-processing engine 210 is configured to receive data files 132 from various Systems of Record (SOR) 130. Each data file 132 is associated with and identifies at least one electronic communication document type 134 and includes variable user data for a plurality of users 140. In specific embodiments of the invention, the data files 132 are received from the various SOR 130 in a standardized format 138 which includes user-specific indexing 139 that is configured to identify each of the users 140 and serves as a pointer to the user variable data 136.

In response to receiving the data files 132, each data file 132 is associated with a content template file 230 from amongst a plurality of content data files 220 based on the electronic communication document type. Each content template file 230 includes common resources 232 (e.g., logo, background graphics, document layout parameters and the like) for generating a corresponding electronic communication document. The data files 410 and their associated content template file 220 are stored within a secure storage unit 220 of first memory 202, such as a storage unit 220 that is Write Once Read Many (WORM) compliant to ensure data integrity.

In alternate embodiments of the system 100, electronic communication document pre-processing engine 210 is further configured to receive historical document files 240, such as Advanced Function Presentation (AFP) files or the like. In specific embodiments, historical document files 240 will have been previously generated and stored in the secure storage unit 220 and, thus, may be received from the same. Each historical document files 240 includes a plurality of electronic communication documents 242, with each document 242 in the file 240 being associated with a corresponding user 140-X from amongst the plurality of users 140. Historical document files 240 may exist in the system for documents generated prior to the inception of the novel on-demand document generation of the present invention. In this regard, historical document files 240 may pertain to older/dated data files in which the document file 240 containing documents for all the users 140 was generated upfront (i.e., prior to the user requesting the document). However, the system is configured to accommodate for the fact that users 140 will occasionally request access to such historical documents.

In response to receiving the historical document files 240, electronic communication document pre-processing engine 210 is further configured to further configured to extract the indexing metadata 244 from each electronic communication document 242 in the historical document file 240 and subsequently store the historical document file 240 and the corresponding associated indexing metadata 244 separately within secure storage unit 220. As will be discussed in relation to FIG. 3, extraction of the indexing metadata 244 and separate storage of such serves to aid/expedite the real-time searching of the historical document file 240 for a specific electronic communication document 242 associated with the requesting user 140.

Referring to FIG. 3, a block diagram is depicted of second computing platform 300 highlighting various alternate embodiments of the system shown and described in relation to FIG. 1, in accordance with embodiments of the present invention. Second computing platform 300 may comprise one or multiple computing devices, such as servers, personal computers (PCs), laptops, mobile communication devices (e.g., smart phones), tablet devices or the like or the like. As previously discussed in relation to FIG. 1, second computing platform 300 includes second memory 302, which may comprise volatile and/or non-volatile memory, such as read-only memory (ROM) and/or random-access memory (RAM), EPROM, EEPROM, flash cards, or any memory common to computing platforms. Moreover, second memory 302 may comprise cloud storage, such as provided by a cloud storage service and/or a cloud connection service.

Further, second computing platform 300 includes one or more second computing processor devices 304, which may be an application-specific integrated circuit ("ASIC"), or other chipset, logic circuit, or other data processing device. Second computing processor device(s) 304 may execute one or more second application programming interface (APIs) 306 that interface with any resident programs, such as electronic communication document generation engine 310 or the like, stored in second memory 302 of second computing platform 300 and any external programs. Second computing platform 300 includes various processing sub-systems (not shown in FIG. 3) embodied in hardware, firmware, software, and combinations thereof, that enable the functionality of second computing platform 300 and the operability of second computing platform 300 on a distributed communication network, such as distributed communication network 110 shown in FIG. 1. For example, processing sub-systems allow for initiating and maintaining communications and exchanging data with other networked devices. For the disclosed aspects, processing sub-systems of second computing platform 300 includes any processing sub-system portion used in conjunction with electronic communication document generation engine 310 and engines, tools, routines, sub-routines, applications, sub-applications, sub-modules thereof.

In specific embodiments of the present invention, second computing platform 300 additionally includes a communications module (not shown in FIG. 3) embodied in hardware, firmware, software, and combinations thereof, that enables electronic communications between components of second computing platform 300 and other networks and network devices. Thus, communication module includes the requisite hardware, firmware, software and/or combinations thereof for establishing and maintaining a network communication connection with one or more devices and/or networks.

As previously discussed in relation to FIG. 1, second memory 302 stores electronic communication document generation engine 310 that is executable by one or more of the second computing processor device(s) 304. Electronic communication document generation engine 310 is configured to receive from user device 130, (e.g., directly from the user 140-1 or an application executing on a user device 130) an electronic communication document request 320 that requests presentation of a document to the user directly or via an application. The electronic communication document request 320 includes (i) a user identifier 323 associated with the user 140-1, (ii) and electronic communication document type identifier (e.g., parameters that define the type of document being requested and other criteria, such time period) and a file type 326 for the requested document (e.g., Portable Document Format (PDF), extensible Markup Language (XML) and Comma-Separated Values (CSV), accessibility-tagged PDF or the like).

In response to and in real-time to receiving the electronic communication request 320, electronic communication document generation engine 310, is configured to access the storage unit 220 to identify a first data file 132-1 based on the electronic communication document type identifier 324 and search and retrieve, from the first data file 132-1, the user's 140-1 variable user data 136-1 based on the user identifier 322 and the indexing data 139 in the first data file 132-1, which includes or otherwise corresponds to the user identifier 322 In response to retrieving the variable user data 136-1, electronic communication document generation engine 310 is configured to generate a first electronic communication document 330-1, in the requested file type 326, using the variable user data 136-1 of the user 140-1 and the common resources 222-1 of the content template file 220-1 associated with the first data file. In specific embodiments of the system, in which the user has requested a file type 326 that includes accessibility-tagging 326-1, such as Americans with Disability Act (ADA) tagged PDF, once the document 330-1 has been generated specific metadata/tags 340 and any other requisite structural information is/are added to the document prior to presenting the first electronic communication document 330-1 to the user 140-1.

In other embodiments of the system in which the electronic communication document request is for a historical document (e.g., prior year end financial statement or the like) as identified by document type identifier 324 which may include a data range/period or the like, electronic communication request 320, electronic communication document generation engine 310, is configured to access the storage unit 220 to identify a first document file 240-1, such as an AFP file based on the electronic communication document type identifier and, using the associated indexing metadata 244-1, search and retrieve, from the first document file 240-1 a second electronic communication document 242-1 from amongst the plurality of electronic communication documents 242 contained in the first document file 240-1. In response to retrieving the second electronic communication document 242-1, the second electronic communication document 242-1 is converted from the document file format (e.g., AFP file format) to the file type 326 in the document request 320. In specific embodiments of the system, in which the user has requested a file type 326 that includes accessibility-tagging 326-1, such as Americans with Disability Act (ADA) tagged PDF, once the second document 242-1 has undergone conversion, specific metadata/tags 340 and any other requisite structural information is/are added to the second document 242-1 prior to presenting the second electronic communication document 242-1 to the user 140-1.

Referring to FIG. 4, a flow diagram is depicted of a method 400 for generating, storing, and presenting electronic communication documents, in accordance with the prior art. At Event 402, data files are received from SORs which contain variable data for a plurality of users. At Event 404, a document file, such as an AFP file or the like is generated for each data file. The document file includes documents (or the components necessary to construct/reconstruct the documents) for each of the corresponding users in the corresponding data file. Subsequently, at Event 406, the document file is stored in secure storage, such as WORM compliant storage or the like. Since the document file includes documents (or the components necessary to construct/reconstruct the documents) for each of the corresponding users in the corresponding data file, the document file is large in size and, as such, requires a corresponding amount of storage space. As more and more document files are generated and stored, the problem over required storage space is exasperated.

At Event 408, an electronic communication document request is received from a user (or a user's application), and at Event 410, the secure storage is accessed and the corresponding document file is searched for the indexing data corresponding to user identifier in the request. Once the indexing data for the user has been identified, at Event 412, the electronic communication document for the user is retrieved from the document file and, at Event 414, the electronic communication document from the document file is converted to the requested document file type, such as PDF, XML, CSV or the like.

At Decision 416, a determination is made as to whether the file type requested includes accessibility tagging, such as ADA tagged PDF or the like. If the document requires accessibility-tagging, at Event 418, tags/metadata and structural data is added to the document. If the document does not require accessibility-tagging or after requisite accessibility tagging has been performed, at Event 420, the electronic communication is outputted or otherwise presented to the user (or the user's application) in the file type requested.

Referring to FIG. 5, a flow diagram is depicted of a method 500 for on-demand generation and presentation of electronic communication documents, in accordance with embodiments of the present invention. At Event 502, data files are received from SORs which are associated with an electronic communication document type and contain variable data for a plurality of users (i.e., document recipients). At Event 504, each data file is associated, based on the document type, with a content template file that includes common resources used to generate the corresponding electronic communication document. Subsequently, at Event 506, the data file and the associated content template file are stored in secure storage, such as WORM compliant storage or the like. Since the data file and associated content template file are much smaller in size than a document file (as shown and described in relation to FIG. 4), the data file and associated content template file occupy much less storage space (and, thus, free up memory) than would be required if upfront generation of document file were to be generated.

At Event 508, an electronic communication document request is received from a user (or a user's application), and at Event 510, the secure storage is accessed and the corresponding the data file is searched for the user indexing data based on the user identifier in the request. Once the user indexing data has been identified, at Event 512, the variable user data and associated content template file are retrieved and, at Event 514, the electronic communication document is generated, in the file type identified in the request, using the variable user data and the common resources from the associated content template file.

At Decision 516, a determination is made as to whether the file type requested includes accessibility tagging, such as ADA tagged PDF or the like. If the document requires accessibility-tagging, at Event 518, tags/metadata and structural data is added to the document. If the document does not require accessibility-tagging or after requisite accessibility tagging has been performed, at Event 420, the electronic communication is outputted or otherwise presented to the user (or the user's application) in the file type requested.

Referring to FIG. 6, a flow diagram is depicted of a method 600 for historical electronic communication document presentation, in accordance with the prior art. At Event 602, historical document files, such as historical AFP files or the like are received, typically from secure storage. At Event 604, indexing data for each user (i.e., from each document) within the document file, is retrieved from the document file. Subsequently, at Event 606, the document files are stored in secure storage, such as WORM compliant storage or the like along with the associated indexing/metadata. Keeping the indexing/metadata in a file separate from the document file leads to a more efficient document retrieval process when the document is subsequently requested by a user or user's application.

At Event 608, an electronic communication document request is received from a user (or a user's application), and at Event 610, the secure storage is accessed and the associated indexing metadata is used to search the document file for the user's document. At Event 612, the electronic communication document is retrieved from the document file and, at Event 614, the electronic communication document from the document file is converted to the requested document file type, such as PDF, XML, CSV or the like.

At Decision 616, a determination is made as to whether the file type requested includes accessibility tagging, such as ADA tagged PDF or the like. If the document requires accessibility-tagging, at Event 618, tags/metadata and structural data is added to the document. If the document does not require accessibility-tagging or after requisite accessibility tagging has been performed, at Event 620, the electronic communication is outputted or otherwise presented to the user (or the user's application) in the file type requested.

Referring to FIG. 7, a flow diagram is depicted of a computer-implemented method 700 for on-demand generation of electronic communication documents, in accordance with embodiments of the present invention. At Event 710, data files are received from SORs. Each data file is associated with an electronic communication document type and contain variable user data for a plurality of users (i.e., document recipients). At Event 720, each data file is associated, based on the document communication document type, with a content template file that includes common resources (e.g., logos, images, layout specifications and the like) used to generate the corresponding electronic communication document. Subsequently, at Event 730, each data file and the associated content template file is stored in secure storage, such as WORM compliant storage or the like.

At Event 740, an electronic communication document request is received from a user (or a user's application) that includes (i) a user identifier associated with the document requester/user, (ii) an electronic communication document type identifier and (iii) a file type. In response to receiving the request (i.e., on-demand), at Event 750, the secure storage is accessed to identify the first data file associated with the document type identifier in the request and search and retrieved, from the first data file, variable user data of the user based on the user identifier. In specific embodiments of the invention, the received data files are in standardized format, such that the user data is categorized under indexing data. In such embodiments of the invention, the data file is searched for the user's corresponding indexing data (e.g., name, account number or the like) based on the user identifier in the request and the variable user data stored under the indexing data is retrieved. At Event 760, a first electronic communication document is generated, in the file type as requested, using the retrieved variable user data, and associated common resources from the associated content template file. At Event 770, the generated electronic communication document is presented or otherwise outputted to the user (or the user's application).

Thus, as described in detail above, present embodiments of the invention include systems, methods, computer program products and/or the like that provide for on-demand generation of electronic/digital communication documents. As a result, the present invention minimizes the storage usage that would otherwise be required by upfront generation and storage of electronic/digital communication documents for the entirety of the users. Specifically, the present invention receives standardized data files from systems of record (SOR) which contain the variable and indexing user data needed to generate the digital communication documents for various users. These data files are associated and stored with a corresponding content template file, which includes all of the static data required to generate the digital communication documents (e.g., logos, page layout and the like). Subsequently, when a request is made (by a user or a user's application) for digital communication document, the data file is accessed and searched for the specific user's variable and indexing data and, once retrieved, the digital communication document is generated, in the desired format, using the user's variable and indexing data and the static data found in the associated content template file. In this regard, generation of the document can be in any file format required of the delivery channel, such as online, mobile application, including video and virtual assistance channels, data insight analysis or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for on-demand generation of electronic communication documents, the system comprising:
 a first computing platform including a first memory and one or more first computing processor devices in communication with the first memory, wherein the first memory stores an electronic communication document pre-processing engine that is executable by at least one of the one or more first computing processor devices and configured to:
  receive data files, wherein each data file (i) is received from a system of record from amongst a plurality of systems of record, (ii) is associated with an electronic communication document type, and (iii) includes variable user data for a plurality of users,
  associate a content template file from amongst a plurality of content template files to each data file based on the electronic communication document type, wherein each content template file includes common resources for a corresponding electronic communication document, and
  store each data file and the associated content template file in a storage unit of the first memory, and
 a second computing platform including a second memory and one or more second computing processor devices in communication with the second memory, wherein the second memory stores an on-demand electronic communication document generation engine that is executable by at least one of the one or more second computing processor devices and configured to:
  receive an electronic communication document request from a user, wherein the electronic communication document request includes (i) a user identifier associated with the user, (ii) an electronic communication document type identifier and (iii) a file type,
  in response to receiving the electronic communication document request,
   access the storage unit of the first memory to (i) identify a first data file based on the electronic communication document type identifier, and (ii) search and retrieve, from the first data file, variable user data of the user based on the user identifier,
   generate a first electronic communication document using the variable user data of the user and the common resources of the content template file associated with the first data file, and present the first electronic communication document to the user in the file type requested.

2. The system of claim 1, wherein the electronic communication document pre-processing engine is further configured to:

receive the data files, wherein each data file is in a standardized format that includes user indexing data associated with or comprising the user identifier.

3. The system of claim 1, wherein the on-demand electronic communication document generation engine is further configured to:

receive the electronic communication document request from the user, wherein the electronic communication document request includes the file type, wherein the file type is chosen from the group consisting of (i) portable document format (PDF), (ii) extensible markup language (XML) and (iii) comma-separated values (CSV).

4. The system of claim 1, wherein the on-demand electronic communication document generation engine is further configured to:

receive the electronic communication document request from the user, wherein the electronic communication document request includes the file type, wherein the file type is accessibility-tagged portable document format (PDF).

5. The system of claim 4, wherein output the first electronic communication document to the user in the file type requested, wherein presenting includes adding metadata and structural information to the electronic communication document.

6. The system of claim 1, wherein the electronic communication document pre-processing engine is further configured to:

receive advanced function presentation (AFP) files, wherein each advanced function presentation file includes a plurality of electronic communication documents, each of the plurality of electronic communication documents associated with a corresponding user from the plurality of users, extract indexing metadata from each of the plurality of electronic communication documents in each of the AFP files, and store each AFP file and corresponding indexing metadata in the storage unit of the first memory.

7. The system of claim 6, wherein the on-demand electronic communication document generation engine is further configured to:

in response to receiving the electronic communication document request, access the storage unit of the first memory to (i) identify a first AFP file based on the electronic communication document type identifier, and (ii) search and retrieve, from the first AFP file, a second electronic communication document from amongst the plurality of electronic communication documents based on the corresponding indexing metadata, convert the second electronic communication document from AFP file format to the file type in the electronic communication document request; and present the second electronic communication document to the user in the file type requested.

8. The system of claim 7, wherein the on-demand electronic communication document generation engine is further configured to receive the electronic communication document request from a user, wherein the electronic communication document request includes the file type, wherein the file type is accessibility tagged portable document format (PDF), and wherein the on-demand electronic communication document generation engine is further configured to output the second electronic communication document to the user in the file type requested, wherein presenting includes adding metadata and structural information to the electronic communication document.

9. A computer-implemented method for on-demand generation of electronic communication documents, the computer-implemented is method executed by one or more computing processor devices and comprising:

receiving data files, wherein each data file (i) is received from a system of record from amongst a plurality of systems of record, (ii) associated with an electronic communication document type, and (iii) includes variable user data for a plurality of users;

associating a content template file from amongst a plurality of content template files to each data file based on the electronic communication document type, wherein each content template file includes common resources for a corresponding electronic communication document;

storing each data file and the associated content template file in a storage unit;

receiving an electronic communication document request from a user, wherein the electronic communication document request includes (i) a user identifier associated with the user, (ii) an electronic communication document type identifier and (iii) a file type;

in response to receiving the electronic communication document request, accessing the storage unit to (i) identify a first data file based on the electronic communication document type identifier, and (ii) search and retrieve, from the first data file, variable user data of the user based on the user identifier;

generating a first electronic communication document using the variable user data of the user and the common resources of the content template file associated with the first data file; and presenting the first electronic communication document to the user in the file type requested.

10. The computer-implemented method of claim 9, wherein receiving the data files further comprises receiving the data files, wherein each data file is in a standardized format that includes user indexing data associated with or comprising the user identifier.

11. The computer-implemented method of claim 9, wherein receiving the electronic communication document request further comprises receiving the electronic communication document from the user, wherein the electronic communication document request includes the file type, wherein the file type is chosen from the group consisting of (i) portable document format (PDF), (ii) extensible markup language (XML) and (iii) comma-separated values (CSV).

12. The computer-implemented method of claim 9, wherein receiving the electronic communication document request further comprises receiving the electronic communication document from the user, wherein the electronic communication document request includes the file type, wherein the file type is accessibility-tagged portable document format (PDF), and wherein presenting further includes adding metadata and structural information to the electronic communication document.

13. The computer-implemented method of claim 9, further comprising:
- receiving advanced function presentation (AFP) files, wherein each advanced function presentation file includes a plurality of electronic communication documents, each of the plurality of electronic communication documents associated with a corresponding user from the plurality of users;
- extracting indexing metadata from each of the plurality of electronic communication documents in each of the AFP files; and
- storing each AFP file and corresponding indexing metadata in the storage unit.

14. The computer-implemented method of claim 13, further comprising:
- in response to receiving the electronic communication document request,
  - accessing the storage unit to (i) identify a first AFP file based on the electronic communication document type identifier, and (ii) search and retrieve, from the first AFP file, a second electronic communication document from amongst the plurality of electronic communication documents based on the corresponding indexing metadata;
  - converting the second electronic communication document from AFP file format to the file type in the electronic communication document request; and
  - presenting the second electronic communication document to the user in the file type requested.

15. A computer program product including a non-transitory computer-readable medium, the non-transitory computer-readable medium comprising sets of codes for causing one or more computing devices to:
- receive data files, wherein each data file (i) is received from a system of record from amongst a plurality of systems of record, (ii) associated with an electronic communication document type, and (iii) includes variable user data for a plurality of users;
- associate a content template file from amongst a plurality of content template files to each data file based on the electronic communication document type, wherein each content template file includes common resources for a corresponding electronic communication document;
- store each data file and the associated content template file in a storage unit;
- receive an electronic communication document request from a user, wherein the electronic communication document request includes (i) a user identifier associated with the user, (ii) an electronic communication document type identifier and (iii) a file type;
- in response to receiving the electronic communication document request,
  - access the storage unit to (i) identify a first data file based on the electronic communication document type identifier, and (ii) search and retrieve, from the first data file, variable user data of the user based on the user identifier;
  - generate a first electronic communication document using the variable user data of the user and the common resources of the content template file associated with the first data file; and
  - present the first electronic communication document to the user in the file type requested.

16. The computer program product of claim 15, wherein the set of codes for causing the one or more computing devices to receive the data files are further configured to cause the one or more computing devices to receive the data files, wherein each data file is in a standardized format that includes user indexing data associated with or comprising the user identifier.

17. The computer program product of claim 15, wherein the set of codes for causing the one or more computing devices to receive the data files are further configured to cause the one or more computing devices to receive the electronic communication document from the user, wherein the electronic communication document request includes the file type, wherein the file type is chosen from the group consisting of (i) portable document format (PDF), (ii) extensible markup language (XML) and (iii) comma-separated values (CSV).

18. The computer program product of claim 15, wherein the set of codes for causing the one or more computing devices to receive the electronic communication document are further configured to cause the one or more computing devices to receive the electronic communication document from the user, wherein the electronic communication document request includes the file type, wherein the file type is accessibility-tagged portable document format (PDF), and
- wherein the set of codes for causing the one or more computing devices to present are further configured to cause the one or more computing devices to present, wherein presenting further includes adding metadata and structural information to the electronic communication document.

19. The computer program product of claim 15, wherein the sets of codes further comprise sets of codes for causing the one or more computing devices to:
- receive advanced function presentation (AFP) files, wherein each advanced function presentation file includes a plurality of electronic communication documents, each of the plurality of electronic communication documents associated with a corresponding user from the plurality of users;
- extract indexing metadata from each of the plurality of electronic communication documents in each of the AFP files; and
- store each AFP file and corresponding indexing metadata in the storage unit.

20. The computer program product of claim 13, wherein the sets of codes further comprise sets of codes for causing the one or more computing devices to:
- in response to receiving the electronic communication document request,
  - access the storage unit to (i) identify a first AFP file based on the electronic communication document type identifier, and (ii) search and retrieve, from the first AFP file, a second electronic communication document from amongst the plurality of electronic communication documents based on the corresponding indexing metadata;
  - convert the second electronic communication document from AFP file format to the file type in the electronic communication document request; and
  - present the second electronic communication document to the user in the file type requested.

* * * * *